UNITED STATES PATENT OFFICE 2,174,795

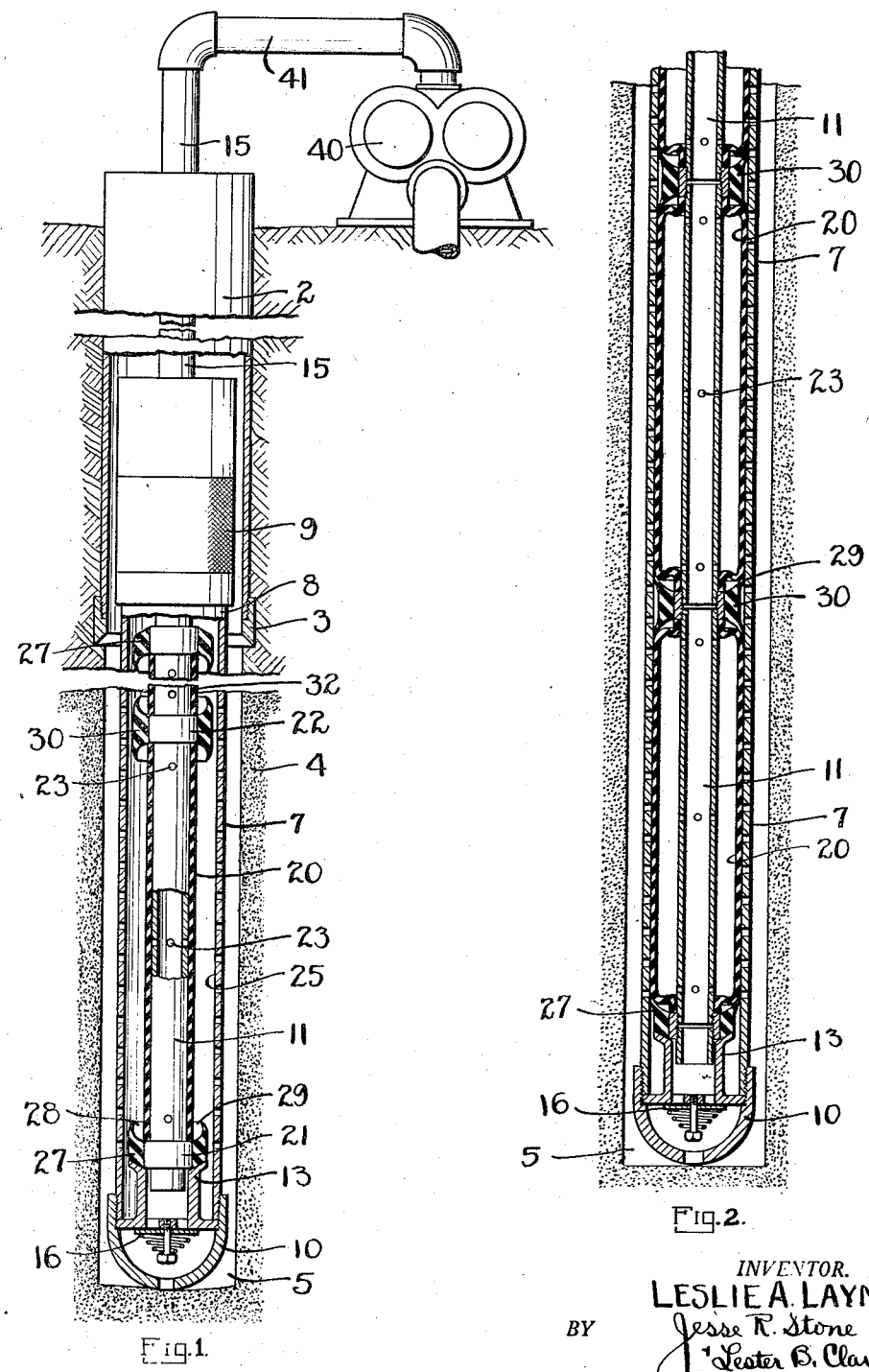

SCREEN PROTECTOR

Leslie A. Layne, Houston, Tex.

Application February 1, 1936, Serial No. 61,872

9 Claims. (Cl. 166—20)

The invention relates to an improvement in protectors of the type to be embodied inside of the screen which is lowered into a well bore in order to protect the screen against the entrance of foreign materials while the screen is being set in position.

It will be understood that in the positioning of the screen in wells drilled by the rotary method that the well bore is filled with heavy mud and other foreign and abrasive material. In order to overcome the formation pressures which have been encountered this column of mud fluid generally remains in the well while the various pieces of equipment are being located in the well so as to bring in production. The screen which is positioned to serve as a strainer for the gas and oil produced must be located opposite the producing formation and must be lowered into position while the well bore is filled with the mud fluid. It is, therefore, desirable to protect the screen as much as possible against the entrance of mud from the outside in order to prevent clogging of the very fine screen openings. Where a fine sand is encountered the screen openings may be as fine as four thousandths (0.004) of an inch in width and it is, therefore, apparent that the screen openings would immediately become clogged if there was an inflow of mud into the screen.

It is, therefore, one of the objects of the invention to protect the screen and prevent the inflow of mud or other foreign matter while the screen is being located and until such time as the mud or other detrimental substances have been removed from the location of the screen.

It is one of the objects of the invention to provide a resilient sleeve inside of the screen member which is arranged for expansion in order to close the screen against any flow of material therethrough.

Another object of the invention is to provide a combination screen and wash line assembly wherein sealing members are provided inside of the screen.

Another object of the invention is to provide a rubber sleeve inside of the well screen and around the wash pipe which is arranged to be expanded by the pressure of the washing fluid so as to move into engagement with the inside of the screen.

Another object of the invention is to provide a wash line and resilient sleeve assembly which can be located inside of the screen in order to seal the screen.

Other and further objects of the invention will be readily apparent when the following description is considered in connection with the accompanying drawing wherein:

Fig. 1 is a side elevation of a well wherein the invention has been applied to the screen and showing the screen and the sealing sleeve in section.

Fig. 2 is an enlarged sectional view of the lower end of the apparatus of Fig. 1 but showing the sleeve as expanded against the inside of the screen in position to form a seal.

Fig. 1 shows a well casing indicated generally at 2. This casing has been set to a sufficient depth to form an anchor for the various parts of the well equipment, and may extend down to an elevation such as 3 directly above a producing formation 4. The well bore is drilled to an elevation 5 and is usually filled with a heavy mud during the drilling operation. In order to overcome the pressure in the formation 4 this mud remains in the well while the screen 7, liner 8, and the packer 9 are lowered into position in order to complete the well.

The guide shoe 10 and the screen 7 are connected at the surface and a wash pipe 11 is then inserted in the seat 13 in the guide shoe and if more than one section of screen and wash pipe are to be connected these parts are assembled and the liner 8 connected to the top thereof along with the packer 9. These parts are lowered in any suitable manner by means of the string of pipe 15 until they arrive at the elevation shown in Fig. 1.

In some instances the screen 7 may be filled with water or other liquid at the time it is being lowered into the well and the back pressure valve 16 prevents the entrance of liquid from below and in view of the fact that this liquid remains in the screen, little or no mud may enter through the screen, it being understood that water or other liquid may be filled in the top of the liner and water, mud, or other liquid is filled in the pipe 15 as the assembly is lowered into the well bore.

It has been found in practice, however, that there may be some inflow of mud through the screen so that it may in this manner have become clogged somewhat to thereafter retard the flow of oil. In order to provide a special construction to maintain a seal in the inside of the screen 7, the wash pipe 11 is equipped with a resilient sleeve indicated generally at 20. This sleeve may be of rubber or other suitable material and preferably extends from the coupling 21 around the lower end of the wash pipe up to the next coupling 22. The wash pipe is provided with a plurality of openings 23 between these couplings and through which there may be a flow of the liquid used in washing the well. The pressure of the liquid tends to expand the sleeve 20 to the position shown in Fig. 2 with the sleeve 20 closely engaging the inside face 25 of the well screen 7. Such pressure is available because the back pressure valve 16 may be provided with a spring strong enough to create a restricted flow or choke so that the pressure of the washing liquid will tend to hold the sleeve 20 expanded.

In this manner the pressure is balanced on the inside and the outside of the screen and, if anything, there is a preponderance of pressure on the inside which tends to hold the sleeve in expanded position.

In order to prevent undue stresses and insure the proper expansion of the sleeve, a plurality of guide collars 27 have been provided. Each of these collars is fixed about a coupling such as 21 and has an upstanding lip 28 which is spaced away from the normal position of sleeve 20, to provide a space 29. When the pressure is applied to the sleeve it will expand and this lip 28 will tend to guide the sleeve outwardly and prevent it from expansion down around the coupling 21 as best seen in Fig. 2. A modified form of the collar 27 is illustrated at 30 on the upper end of the first wash pipe section, and this collar is the same as the one previously described, but is provided with both upper and lower lips in order to guide the second section 32 of the expansible sleeve in its movement. The upper collar 27 is the same as the lower collar previously described but is inverted in its position as will be seen in Fig. 1.

In practicing the invention the screen 7 may or may not be filled with water or other liquid as desired and will be then lowered in the position shown in Fig. 1 and when the fluid pressure is applied to the pipe line 15 there will be a flow through the openings 23 in order to expand the sleeve 20 to the position shown in Fig. 2. This expansion of the sleeve 20 will drive the water or liquid from inside of the screen if it has been filled and will purge the screening area of any mud or foreign material which may have accumulated thereon as the screen was being lowered. The pressure tends to hold the sleeve 20 expanded against the inside of the screen and prevent any inflow of fluid. With the parts in this position as seen in Fig. 2 the washing operation will be performed by pumping liquid downwardly through the wash pipe 11 through the back pressure valve 16 and around and up the outside of the screen 7.

When the returns at the top of the well indicate that sufficient mud has been removed from the well bore around the screen, then the washing may be discontinued and the pressure on the wash pipe 11 relieved. This will permit the sleeves 20 to contract because of their inherent resiliency so that they will withdraw away from the inside surface 25 of the screen 7. In this manner the sleeves will be released from any frictional engagement with the screen and the entire wash pipe and the expansible sleeves can be withdrawn from the well, it being understood that in this operation the wash pipe is withdrawn from its seat 13.

It will be noted that the lower collar 27 abuts the wash pipe seat 13 to form a seal therewith so that there can be no leakage around the pipe. The pressure inside the sleeve 20 tends to move the lip 28 outwardly.

A suitable pump 40 is arranged on the surface and connected by the line 41 to the pipe 15 in order to circulate the washing liquid.

Broadly the invention contemplates an expansible member to seal the inside of the screen during the washing operation.

What is claimed is:

1. The combination with a screen and wash pipe for wells, of a resilient member disposed about said pipe and within said screen to completely close all of the openings in the screen.

2. A screen protective device to be lowered into the well bore with the screen to seal the same during the setting and well washing operation comprising a wash pipe, and a resilient member thereon to be moved outwardly against the inside of the screen to underlie all of the strainer openings therein.

3. A screen protective device to be lowered into the screen to seal the same during the screen and well washing operation comprising a wash pipe, a resilient member thereon to be moved outwardly against the inside of the screen, and couplings on said pipe to guide said member in its movement.

4. The combination with a well screen of a wash pipe, a wash pipe seat, a resilient member about said pipe to engage said seat to form a seal therewith, a lip on said member, and resilient sleeve about said pipe to be guided in its expansion by said lip.

5. A wash pipe for wells comprising a pipe, a resilient sleeve about said pipe, means so that the fluid pressure in said pipe will be applied inside the sleeve to effect expansion thereof, and resilient collars on said pipe to guide said sleeve in its expansion.

6. A method of protecting a strainer screen being lowered into a well bore which comprises the steps of assembling a screen with a shoe and back pressure valve, inserting in the screen a pipe carrying a resilient member thereabout and which has openings through the wash pipe into the inside of the member, lowering this assembly into the well bore while maintaining a greater fluid pressure on the wash pipe to maintain the member expanded against the inside of the screen than is exerted on the outside of the screen by the column of liquid in the well bore.

7. A method of setting a strainer screen to protect the screen against clogging during the washing operation which includes the steps of assembling the packer strainer back pressure valve and wash pipe with a sealing member between the wash pipe and the inside of the strainer, and maintaining a preponderance of fluid pressure on the inside of the wash pipe to maintain the sealing member in contact with the inside of the strainer to seal the openings, washing the well, setting the packer, and removing the sealing member.

8. A method of protecting the screening area of a well strainer pipe against becoming clogged while the strainer is being lowered and set in a well containing drilling fluid comprising the steps of covering the inside surface of the strainer pipe so as to cut off the inflow or outflow of fluid, maintaining the covering in place by hydraulic pressure therein until the strainer has been set and the drilling fluid removed from the well, setting a packer to seal the outside of the strainer, and removing the covering to open the strainer.

9. A method of protecting the screening area of a well strainer pipe against becoming clogged while the strainer is being lowered and set in a well containing drilling fluid comprising the steps of hydraulically expanding a covering to effect cutting off the inflow or outflow of fluid, maintaining the cutoff until the strainer has been set and the drilling fluid removed from the well, and removing the covering to open the strainer.

LESLIE A. LAYNE.